United States Patent
Cenciotti et al.

(10) Patent No.: US 11,526,509 B2
(45) Date of Patent: Dec. 13, 2022

(54) INCREASING PERTINENCE OF SEARCH RESULTS WITHIN A COMPLEX KNOWLEDGE BASE

(71) Applicant: INTERNATIONAL BUSINESS MACHINES CORPORATION, Armonk, NY (US)

(72) Inventors: Glauco Cenciotti, Rome (IT); Aniello Alessandro Rea, Rome (IT); Roberto Guarda, Pomezia (IT); Vittorio Carullo, Rome (IT); Emanuele Vercalli, Viterbo (IT)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 17/139,078

(22) Filed: Dec. 31, 2020

(65) Prior Publication Data
US 2022/0207038 A1 Jun. 30, 2022

(51) Int. Cl.
*G06F 16/2452* (2019.01)
*G06F 16/242* (2019.01)
*G06N 3/04* (2006.01)
*G06K 9/62* (2022.01)
*G06F 16/248* (2019.01)

(52) U.S. Cl.
CPC ...... *G06F 16/24522* (2019.01); *G06F 16/248* (2019.01); *G06F 16/2428* (2019.01); *G06K 9/6256* (2013.01); *G06K 9/6263* (2013.01); *G06N 3/0454* (2013.01)

(58) Field of Classification Search
CPC ........... G06F 16/24522; G06F 16/2428; G06F 16/248; G06K 9/6256; G06K 9/6263; G06N 3/0454
See application file for complete search history.

(56) References Cited

U.S. PATENT DOCUMENTS

| | | |
|---|---|---|
| 9,330,090 B2 | 5/2016 | Gulwani |
| 9,851,950 B2 | 12/2017 | Wolfram |
| 10,275,514 B2 | 4/2019 | Beller |

(Continued)

OTHER PUBLICATIONS

Disclosed Anonymously, "Method to Effectively Generate Concept-based Boolean Search Strings using Natural Language Processing", IP.com Prior Art Database Technical Disclosure, P.com No. IPCOM000259003D, IP.com Electronic Date: Jul. 2, 2019, 7 pages.

(Continued)

*Primary Examiner* — Albert M Phillips, III
(74) *Attorney, Agent, or Firm* — Anthony M. Pallone

(57) ABSTRACT

An embodiment of the invention may include a method, computer program product and system for processing a natural language query. An embodiment may include receiving text of the natural language query. An embodiment may include extracting a set of features from the text through natural language processing. An embodiment may include generating a structured query based on the set of features. An embodiment may include normalizing the text to create a normalized natural language query. An embodiment may include executing a search of a corpus via the structured query and the normalized natural language query. An embodiment may include returning results of the search.

17 Claims, 11 Drawing Sheets

(56) References Cited

U.S. PATENT DOCUMENTS

| | | | |
|---|---|---|---|
| 2015/0178273 A1* | 6/2015 | Hakkani-Tur | G06F 40/40 |
| | | | 704/9 |
| 2015/0254211 A1 | 9/2015 | Gulwani | |
| 2016/0012105 A1* | 1/2016 | Chang | G06F 16/248 |
| | | | 707/706 |
| 2017/0199928 A1 | 7/2017 | Zhao | |
| 2018/0014047 A1 | 1/2018 | Ruxton | |
| 2018/0143978 A1 | 5/2018 | Chang | |

OTHER PUBLICATIONS

Zhong et al., "Seq2SQL: Generating Structured Queries From Natural Language Using Reinforcement Learning", arXiv:1709.00103v7, Nov. 9, 2017, 12 pages.

Mell et al., "The NIST Definition of Cloud Computing", Recommendations of the National Institute of Standards and Technology, NIST Special Publication 800-145, Sep. 2011, 7 pages.

* cited by examiner

INCREASING PERTINENCE OF SEARCH RESULTS WITHIN A COMPLEX KNOWLEDGE BASE

BACKGROUND

Embodiments of the present invention relate generally to the field of information retrieval, and more specifically, to improving the precision, recall, and pertinence of search results of queries within a knowledge base.

Information retrieval is the activity of obtaining information system resources that are relevant to an information need from a collection of those resources. Searches can be based on full-text or other content-based indexing. Information retrieval is the science of searching for information in a document, searching for documents themselves, searching for associated metadata. The searched for information may include varying combinations of texts, images, and sounds. Moreover, the searched for information may include structured and/or unstructured data and may be stored in one or more databases accessible by a computer system. An information retrieval system is a software system that provides access to data, stores data, and manages data. Examples of information retrieval systems include widely used internet search engines.

BRIEF SUMMARY

An embodiment of the invention may include a method, computer program product and system for processing a natural language query. An embodiment may include receiving text of the natural language query. An embodiment may include extracting a set of features from the text through natural language processing. An embodiment may include generating a structured query based on the set of features. An embodiment may include normalizing the text to create a normalized natural language query. An embodiment may include executing a search of a corpus via the structured query and the normalized natural language query. An embodiment may include returning results of the search.

DETAILED DESCRIPTION

Figure 1A:
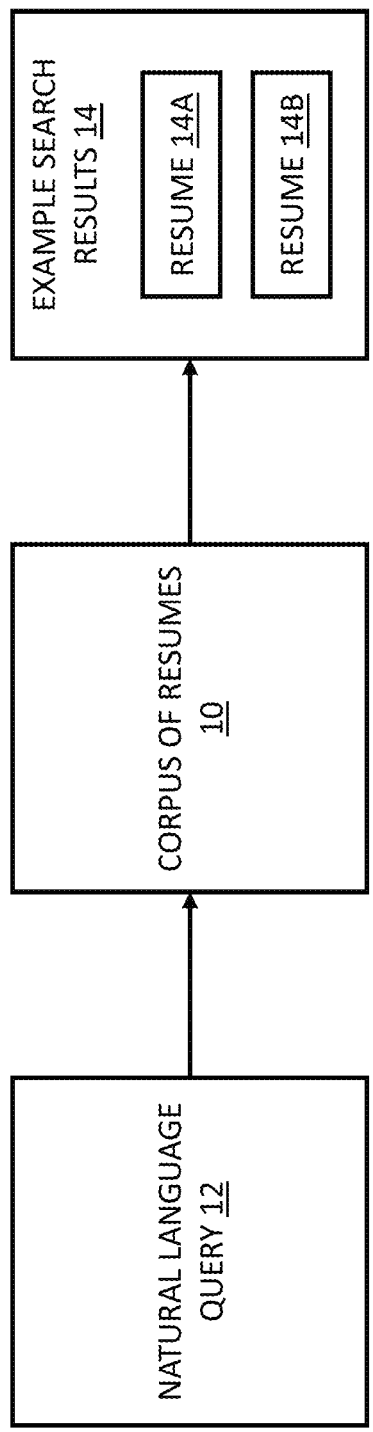
FIGS. 1A-B depict illustrative examples of search results resulting from natural language queries without implementation of the information retrieval system of FIG. 2, in accordance with an embodiment of the invention.

As mentioned above, search engines (e.g., web search engines and question answering systems) are examples of commonly used information retrieval systems. An information retrieval process begins when a user enters a query for a desired object into the system. Queries are statements describing information needs of the user and may include formats such as structured search strings and natural language queries. An object is an entity (e.g., text document, image, audio file, video file, etc.) that is represented by information in a content collection or database. In information retrieval, a query may not uniquely identify a single object within a collection of objects, but rather, several objects may match the user's query. This potential outcome may negatively impact search results as some of the matched objects may not be relevant to the user's query. With the increased usage of computing networks, such as the Internet, users are often inundated and overwhelmed with the amount of retrievable information returned to them from queries of various structured and unstructured data sources. Moreover, the difficulty associated with an overwhelming amount of search results is further complicated as the results may have differing degrees of relevancy to the user's query.

Additionally, most of the information we use and search for today is increasingly available in unstructured formats (e.g., email, PDFs and Word documents, application logs, chat/forum transcriptions, and so on). The task of building an information retrieval system that allows a user to find relevant information or receive a relevant answer in response to a query is becoming more and more difficult as the quantity of information (e.g., unstructured and structured data) managed by these systems is rapidly increasing. Several statistical metrics such as precision, recall, and relevance are used to measure the performance and effectiveness of an information retrieval system.

Relevance denotes how well a retrieved object or set of objects (e.g., a retrieved document or set of documents) meets the information need of the user. For example, relevance indicates the ability of the system to attribute better ranking to the retrieved documents considered most important by a domain expert. Relevance is a qualitative measurement as it is somewhat subjective and tied to expectations of the user. In talking about performance measurement, another qualitative metric called pertinence is often used. Pertinence refers to the subjective perception of the user that the system is performing according to his expectations. Pertinence is a subjective metric that is linked mostly to relevance and recall.

In the context of information retrieval, precision and recall are defined in terms of a set of retrieved documents (e.g., the list of documents returned by a search engine in response to a query) and a set of relevant documents (e.g., the list of all documents within the searched corpus that are relevant for a certain topic). Precision indicates the number of relevant documents retrieved in response to a query divided by the total number of documents retrieved by the query. Precision is the fraction of retrieved documents that are relevant to the query. Recall is the number of relevant documents retrieved in response to a query divided by the total number of existing relevant documents within the searched corpus. Recall is the fraction of the relevant documents that are successfully retrieved. To put it another way, precision indicates the percentage of documents returned relating to the search criterion compared to the total number of documents resulting from the search, whereas recall indicates the percentage of documents returned relating to the search criterion with respect to the totality of the documents expected as a result.

Precision and recall are metrics that deal with different aspects of performance measurement. For instance, a perfect precision score of 1.0 means that every result retrieved by a search was relevant, however it says nothing about whether all relevant documents were retrieved; whereas a perfect recall score of 1.0 means that all relevant documents were retrieved by the search, however it says nothing about how many irrelevant documents were also retrieved. Furthermore, often there is an inverse relationship between precision and recall, where it is possible to increase one metric at the cost of reducing the other metric. Consequently, it is difficult to improve both metrics as they are focused on opposite targets and the cost.

Recall may be improved through the use of a user query in natural language format (i.e., natural language query), since all the words used in the search criterion influence the search results. While precision may be improved through the capability of tagging document content, using tools that are able to analyze the content according to specific ontologies and/or type systems (i.e., natural language processing tools), and through using structured search languages (i.e., a structured search) that can leverage the tags associated with the content of the documents.

Free text and cognitive search engines such as Google, Lucene, Elastic Search, and Watson Discovery are able to support both structured searches and natural language queries with different search syntax. For example, natural language query for free text contents (e.g., document text/summary) and structured search for parameter fields (e.g., tags for document type, publication date, etc.). These query strategies can also be combined to realize the advantages of both of them, however this results in very complex user interfaces where users are asked to deal with complicated forms. Typical examples of such interfaces are advanced query panels used to support these capabilities; however, they are used very occasionally as users generally want only to type a natural language search (i.e., a natural language query) within a single text field. Accordingly, there is a need for a search solution that incorporates the capabilities and advantages of utilizing natural language queries and structured searches while allowing the user to interact only with a natural language query and not burdening the user with complex user interfaces.

In an effort to meet the need stated above, embodiments of the present invention may include an Information Retrieval (IR) System 100, described below, which presents a system, computer program product, and associated method to leverage advantages offered by the use of natural language queries in terms of query results recall, while also providing advantageous results in terms of query results precision by also leveraging tags (i.e., metadata) associated with documents of the searched corpus. IR System 100 will automatically generate the associated tags through analysis of the natural language query using natural language processing tools trained with custom/specialized language processing models. Through the use of IR System 100, a user is able to perform queries with the same advantages and capabilities offered by an advanced search panel form, while interacting using only natural language (e.g., a natural language query using a single text field). This benefit provided by IR System 100 becomes even more useful and apparent with the increasing availability of devices that support vocal interaction (e.g., voice to text functionality) with digital assistants such as Alexa and Google Home.

In order to improve the so called pertinence of the search results, IR System 100 combines the search approaches of natural language query and structured search in order to support interactions with the user through natural language queries, ensuring high recall performance, while also promoting high precision performance through filtering based on tags automatically extracted from the user's natural language query.

As stated above, embodiments of the present invention describe an information retrieval system (i.e., IR System 100) that is able to process a natural language query, while being further able to enhance the query result precision by automatically extracting relevant tags from the user's natural language query, and filtering, based on the extracted tag information, the query results according to a language model for a specific domain.

For an illustrative example of the benefits of IR System 100, consider the use case where there is a need to build an information retrieval system for a job recruiting agency. In this use case the system includes a corpus of candidate resumes and one or more listings of job offerings available on the market. The totality of these documents (e.g., resumes and job offerings) contain a large amount of unstructured data that the system will need to take into account in order to match skills and experiences listed in the job offerings with relevant skills and experiences described in the resumes. Suppose that one of the requirements is the capability to automatically match job offerings with available resumes, in order to identify potentially viable candidates. Suppose further, that another requirement could be the capability to describe the job offering by voice and being able to find candidates with relevant resumes.

Figure 1B:
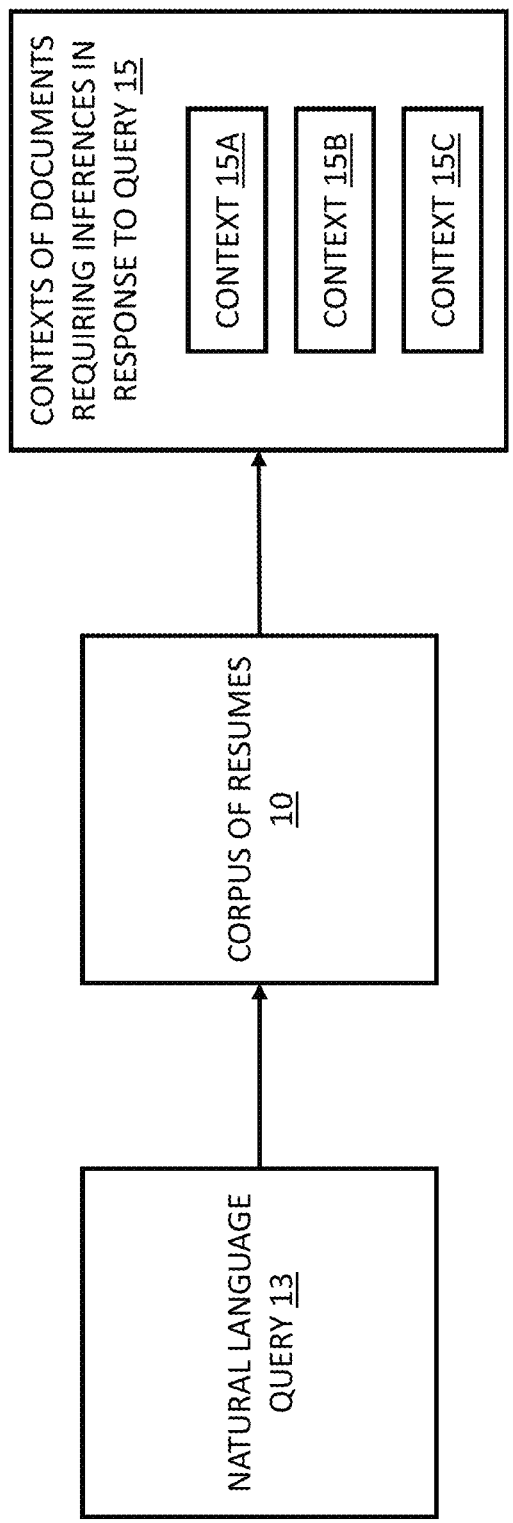

As mentioned before, there are existing solutions that support natural language query interaction in order to achieve advantageous recall results and enable voice interaction with the system. Our illustrative example can make use of such a solution resulting in advantageous search results recall (i.e., no resumes with the relevant skill and level of experience are exclude in the returned search results). Such a solution promotes advantageous recall; however, it is at the cost of search results precision (i.e., the resulting search result precision is very low). For example, as shown in FIG. 1A, in response to a search of corpus of resumes 10 via natural language query, 12, which recites "We need a profile with at least 3 years of experience as Senior Consultant in AI area", FIG. 1A depicts example search results 14 which includes two example returned resumes illustrating the low precision of the search results as resume 14A, which recites, "Senior consultant AI—Data&Analytics area starting from 2014 . . . ", is relevant to natural language query 12 and resume 14B, which recites "Junior consultant starting from 2018. I worked as back-office operator for the previous three years . . . ", is not relevant to natural language query 12. Moreover, such a solution does not support natural language queries that require inferences based on the context of the documents. For example, as shown in FIG. 1B, in response to a search of corpus of resumes 10 via natural language query 13, which recites "We are looking for a CEO with 4 years of experience in the role at a medium-sized IT company", FIG. 1B depicts contexts of documents requiring inferences in response to query 15 which includes three different document contexts which require inference, namely, context 15A which recites "my aspiration is to become CEO of a big company", context 15B which recites "I worked with the CEO of a small company for many activites", and context 15C which recites "since 2011 I'm the CEO of the XYZ company".

Figure 1C:
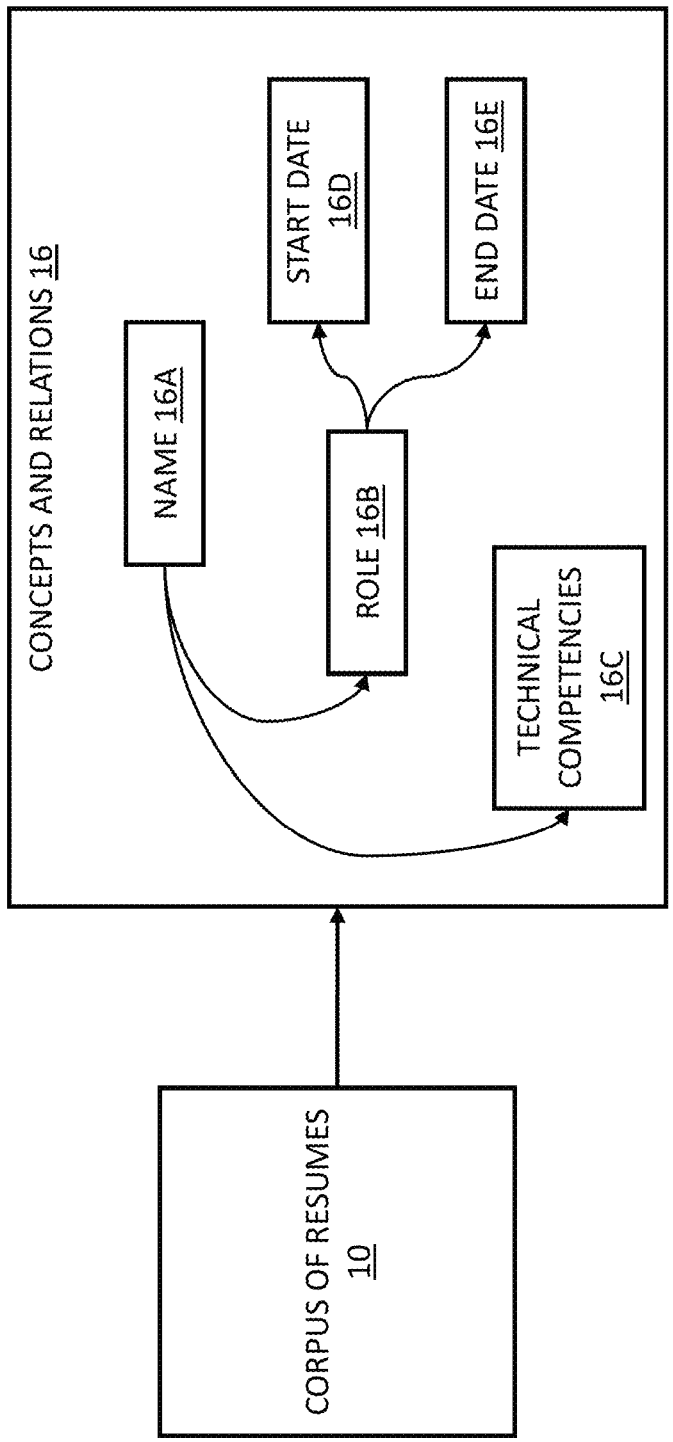
FIG. 1C is a diagram of aspects of the information retrieval system of FIG. 2 involved with natural language processing, according to an embodiment of the invention.

In order to achieve increased performance in terms of precision when performing a natural language query, IR System 100 leverages one or more natural language processing engines which are able to analyze unstructured text content (e.g., text content of the resumes and/or text content of job offerings) and extract general purpose concepts and relations or domain specific concepts and relations (i.e., tags). This process is depicted in FIG. 1C which shows example concepts and relations 16 (e.g., name 16A, role 16B (with start date 16D and end date 16E), and technical competencies 16C) extracted from the corpus of resumes 10 via one or more natural language processing engines (not shown). Through extracting concepts and relations when documents are ingested into the system, IR System 100 can tag the contents of the documents and thus is able to support natural language queries that work on structured data.

Embodiments of the present invention will now be described in detail with reference to the accompanying Figures.

Figure 2:
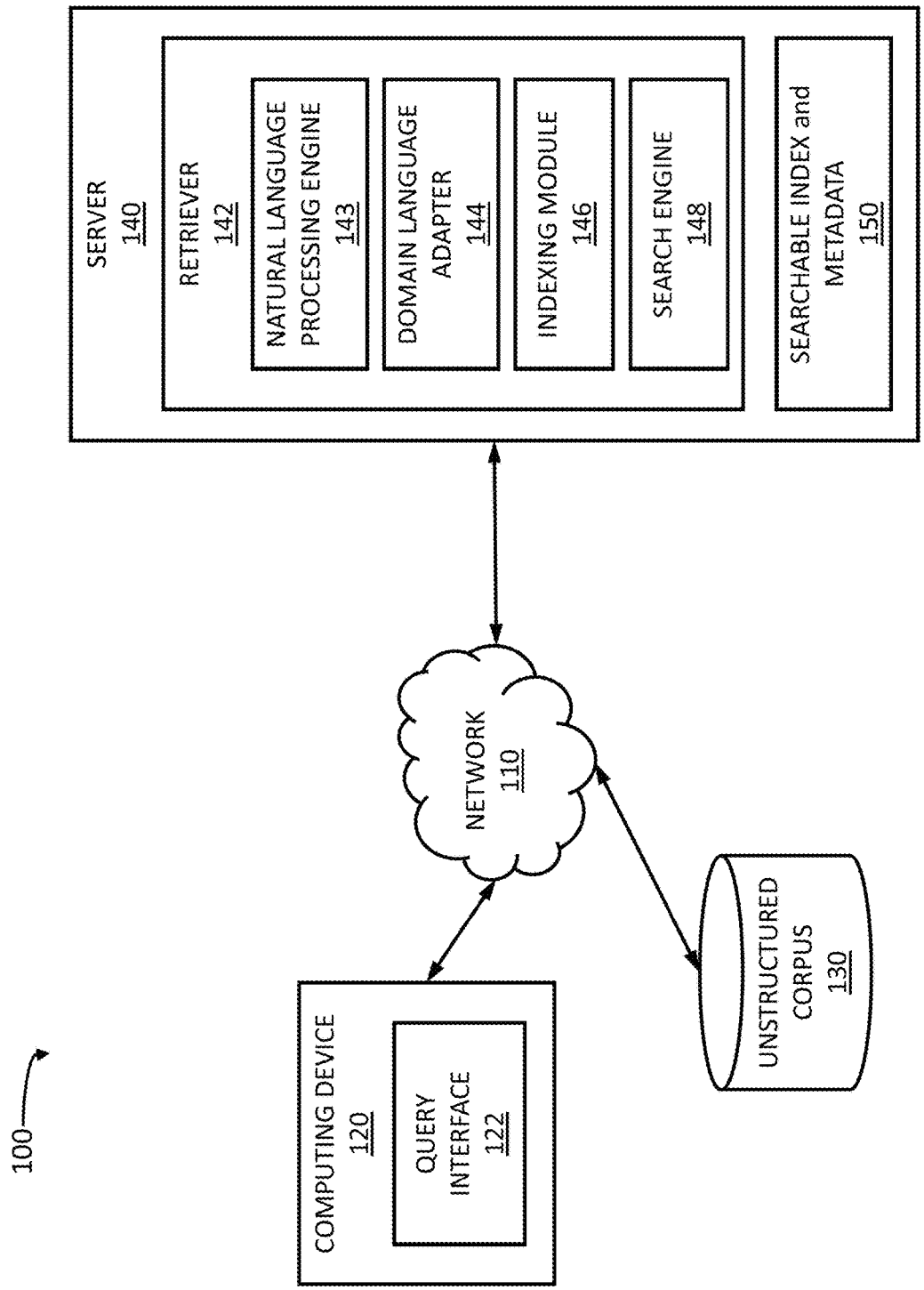
FIG. 2 is a block diagram illustrating an information retrieval system, in accordance with an embodiment of the present invention.

FIG. 2 is a functional block diagram illustrating Information Retrieval System 100, in accordance with an embodiment of the present invention. Information Retrieval System 100 is a network of computers, data processing systems, and other devices in which the illustrative embodiments may be implemented. In an example embodiment, Information Retrieval System 100 may include computing device 120, unstructured corpus 130, and server 140, all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support an information retrieval environment (e.g., an accessible search engine, a question/answer system) and may support communications between computing device 120, unstructured corpus 130, and server 140.

In an example embodiment, computing device 120 may include query interface 122. Computing device 120 may be a laptop computer, a notebook, a tablet computer, a netbook computer, a personal computer (PC), a desktop computer, a personal digital assistant (PDA), a smart phone, a wearable computing device, a smart tv, or any other electronic device or computing system capable of sending, and receiving data to and from other computing devices such as unstructured corpus 130 and server 140, via network 110, and capable of supporting the functionality required of embodiments of the invention (e.g., executing a user query via IR System 100). For example, computing device 120 may support a communication link (e.g., wired, wireless, direct, via a LAN, via the network 110, etc.) between computing device 120, unstructured corpus 130, and server 140. Data sent from computing device 120 may include data from query interface 122. Data received by computing device 120 may include data sent, via network 110, from one or more of unstructured corpus 130 and server 140, described below. While computing device 120 is shown as a single device, computing device 120 may represent a plurality of workstations corresponding to a plurality of different users. The users may be, for example, users of an information retrieval application implemented via a search engine. Computing device 120 may be described, generally, with respect to FIG. 7 below. In an example embodiment, computing device 120 may send, via network 110, data captured by query interface 122 to retriever 142 located on server 140. In an example embodiment, computing device 120 may receive data from retriever 142 located on server 140.

In an example embodiment, query interface 122 may be a program, or subroutine contained in a program, that may operate to receive one or more questions from a user of computing device 120, interact with retriever 142 located on server 140, via network 110, and present query results to the user. In an example embodiment, query interface 122 may be a user interface for a software application executing a search of a corpus via IR System 100 (e.g., an internet search engine for querying a corpus). For example, a user of IR System 100 may call upon functions provided by retriever 142, via query interface 122. In addition, query interface 122 may be connectively coupled to hardware components, such as those depicted by FIG. 7, for receiving user input, including mice, keyboards, touchscreens, microphones, cameras, and the like. In an example embodiment, query interface 122 is implemented via a web browsing application containing a graphical user interface (GUI) which includes at least one text field for entering a natural language query by the user of computing device 120. The entered natural language query is transmitted to retriever 142 located on server 140, via network 110. In an example embodiment, the GUI for query interface 122 also contains a field for presenting, to the user of computing device 120, search results in response to the entered natural language query. The search results are received from retriever 142 located on server 140, via network 110. In other embodiments, query interface 122 may be implemented via other integrated or standalone commercially available, open source, or proprietary software applications and hardware capable of receiving user interaction and communicating with other electronic devices. Additionally, in an example embodiment, query interface 122 may send and receive data (e.g., unstructured data in the form of candidate resumes) to and from unstructured corpus 130 and server 140, via network 110.

In an example embodiment, unstructured corpus 130 is a data repository that may be hosted by a desktop computer, a notebook, a laptop computer, a blade server, a networked computer appliance, a virtual device, a thin client, or any other networked electronic device or computing system capable of receiving and sending data from and to another computing device such as computing device 120 and server 140, via network 110, and capable of supporting the functionality required of embodiments of the invention. In embodiments of the present invention, unstructured corpus 130 may store data in unstructured formats. The unstructured data may include, but is not limited to, emails, PDFs and Word documents, application logs, and chat/forum transcriptions. In embodiments of the present invention, the data stored within unstructured corpus 130 may be populated during an initialization process of IR System 100 and thereafter routinely updated. In embodiments of the present invention, the data stored in unstructured corpus 130 may be partially structured and/or unstructured. Moreover, the data within unstructured corpus 130 may be written in programming languages of common file formats such as .docx, .doc, .pdf, .rtf, .mp3, .wma, .m4p, .wav, .jpg, .tif, .gif, .bmp, etc. In an example embodiment, unstructured corpus 130 may store data including resumes of job candidates and one or more listings of job offerings. In an example embodiment, the data stored within unstructured corpus 130 may be accessible by retriever 142, natural language processing engine 143, and/or domain language adapter 144, via server 140 and network 110. While unstructured corpus 130 is shown as a single device, in other embodiments, unstructured corpus 130 may be comprised of a cluster or plurality of computing devices, working together or working separately. In another embodiment, unstructured corpus 130 may be located in server 140. Unstructured corpus 130 may be described generally with respect to FIG. 7 below.

In an example embodiment, searchable index and metadata 150 is a data repository and a component of server 140 and is capable of supporting the functionality required of embodiments of the invention. In another embodiment, searchable index and metadata 150 is a data repository that may be hosted by a desktop computer, a notebook, a laptop computer, a blade server, a networked computer appliance, a virtual device, a thin client, or any other networked electronic device or computing system capable of receiving and sending data from and to another computing device such as computing device 120 and server 140, via network 110. In embodiments of the invention, searchable index and metadata 150 may store indexed data in structured formats. In embodiments of the invention, the structured data is specific to a search application and is stored in a binary, proprietary format. For example, the structured data may include, but is not limited to, emails, PDFs and Word documents, application logs, and chat/forum transcriptions, each with corresponding metadata (i.e. tagged information). In embodiments of the present invention, the structured data stored within searchable index and metadata 150 may be populated during an initialization process and/or enrichment phase of IR System 100 and thereafter routinely updated. In an example embodiment of the present invention, the structured data stored in searchable index and metadata 150 may be received from natural language processing engine 143 and/or domain language adapter 144. Furthermore, the structured data stored in searchable index and metadata 150 may be accessible by retriever 142 and/or search engine 148. Moreover, the structured data within unstructured corpus 130 may be written in programming languages of common file formats such as .docx, .doc, .pdf, .rtf, .mp3, .wma, .m4p, .wav, .jpg, .tif, .gif, .bmp, etc. In an example embodiment, searchable index and metadata 150 may store structured data including resumes of job candidates and one or more listings of job offerings, along with associated metadata (i.e., tagged information) for each resume and job offering. The metadata (i.e., tagged information) corresponding to each resume and each job offering may include question component types, e.g., entity type, relationship type, question type, or any of a plethora of other defined types resulting from natural language processing techniques applied to the resumes of job candidates and the documented job offerings. In another embodiment, searchable index and metadata 150 may be located outside of server 140. In such an embodiment, searchable index and metadata 150 may comprise a single computing device or may comprise of a cluster or plurality of computing devices, working together or working separately.

In an example embodiment, server 140 may include retriever 142 and searchable index and metadata 150. Server 140 may be a desktop computer, a notebook, a laptop computer, a blade server, a networked computer appliance, a virtual device, or any other networked electronic device or computing system capable of receiving and sending data from and to other computing devices such as computing device 120 and unstructured corpus 130, via network 110, and capable of supporting the functionality required of embodiments of the invention. In embodiments of the invention, server 140 may host an information retrieval application and a search engine (e.g., retriever 142 and search engine 148) for execution of user queries received from query interface 122, via computing device 120 and network 110. In an example embodiment, server 140 may function to process data received from computing device 120 and unstructured corpus 130, via network 110. While server 140 is shown as a single device, in other embodiments, server 140 may represent a cluster or plurality of servers, working together or working separately. Server 140 may be described generally with respect to FIG. 7 below.

In an example embodiment, retriever 142 may include subcomponents natural language processing engine 143, domain language adapter 144, indexing module 146, and search engine 148. Retriever 142 may be a program, or subroutine contained in a program, that may receive a natural language query, process the received natural language query according to aspects of the present invention, and execute the processed natural language query against a corpus within IR System 100. In an example embodiment, retriever 142 may receive, via network 110, a natural language query entered by a user into query interface 122 located on computing device 120. Retriever 142 may send the received query to natural language processing engine 143 and/or domain language adapter 144 for natural language processing and structured query transformation, respectively, before sending the query to indexing module 146 and search engine 148. Furthermore, in an example embodiment, retriever 142 may access, via network 110, data stored in unstructured corpus 130 and send the accessed data to natural language processing engine 143 and/or domain language adapter 144. Moreover, in an example embodiment, retriever 142 may transmit, via network 110, search results received from search engine 148 to query interface 122 located on computing device 120 for presentation to a user. The operations and functions of retriever 142 are described in further detail below with regard to FIG. 3 and FIG. 4.

In an example embodiment, natural language processing engine 143 may be a program, or subroutine contained in a program, that may operate to receive an input question in a natural language format, and parse the question using natural language processing (NLP) techniques to extract and classify major features from the input question according to question component types, e.g., entity type, relationship type, question type, or any of a plethora of other defined types. In addition, the extracted major features may include key words and phrases classified into question characteristics, such as the lexical answer type (LAT) or QCLASS of the question. Furthermore, in embodiments of the invention, natural language processing engine 143 may operate to parse, using the above-mentioned NLP techniques, data stored within unstructured corpus 130. In an example embodiment, documents related to job offerings/posts and resumes are collected within unstructured corpus 130 and sent, via network 110 and retriever 142, to natural language processing engine 143. Natural Language Processing engine 143 analyzes the unstructured content of the documents using standard or specific domain models, extracts features (e.g., keywords, entities, concepts and relations), and packages them as document metadata (i.e., tagged information). Furthermore, in an example embodiment, natural language processing engine 143 may send the parsed/extracted output from analysis of the documents to domain language adapter 144 prior to storage within searchable index and metadata 150. In an example embodiment, natural language processing engine 143 may receive and parse natural language queries captured via text entered into query interface 122. Natural Language Processing engine 143 analyzes the received text using standard or specific domain models, extracts features (i.e., creates tagged information/metadata) such as keywords, entities, concept and relations, and sends both the extracted features and the original natural language query/captured text to domain language adapter 144 prior to storage within searchable index and metadata 150. In an example embodiment, natural language processing engine 143 may also send extracted features to indexing module 146.

In an example embodiment, domain language adapter 144 may be a program, or subroutine contained in a program, that may operate to take in as input features extracted by natural language processing engine 143 and generate, via a neural network algorithm that adapts the discrete input elements of the feature set, a structured query language suitable for search engine 148. Additionally, in an example embodiment, domain language adapter 144 processes the user input natural language query in order to normalize it according to corresponding domain specific training. Domain language adapter 144 returns as output, to natural language processing engine 143, indexing module 146, and/or search engine 148, both the normalized natural language query and the extracted tagged information/metadata in a structured query language suitable (e.g., a structured query language according to a defined grammar and syntax of search engine 148) for execution by search engine 148 to increase the precision of the search results.

In an example embodiment, indexing module 146 may be a program, or subroutine contained in a program, that creates one or more indices of output received from natural language processing engine 143 and/or domain language adapter 144. The received output may include the original data stored within unstructured corpus 130 which has been analyzed/processed by natural language processing engine 143, along with any tagged information extracted by natural language processing engine 143 and/or domain language adapter 144. The received output may also include any parsed and/or normalized natural language queries processed by natural language processing engine 143 and/or domain language adapter 144. In an example embodiment, the indices created by indexing module 146 are stored within searchable index and metadata 150. In embodiments of the invention, a created index may contain information such as the location(s) of where data corresponding to tagged information (i.e., metadata) is located and the type(s) of data structure corresponding to the data. In embodiments of the invention, a created index may be used to facilitate search and retrieval, from searchable index and metadata 150, of data with corresponding metadata, such as in response to a natural language query from a user. In embodiments of the invention, the indexing functionality of indexing module 146 may focus on a more traditional full-text indexing of natural language content in the documents and metadata returned by natural language processing engine 143 and/or domain language adapter 144. In an example embodiment, indexing module 146 creates one or more indices of job resumes and job offerings analyzed/process by natural language processing engine 143 and/or domain language adapter 144 and having corresponding tagged information. These created indices are stored within searchable index and metadata 150.

In an example embodiment, search engine 148 may be a program, or subroutine contained in a program, that may execute a natural language query entered by a user of computing device 120 via query interface 122. In an example embodiment, search engine 148 may search searchable index and metadata 150 for documents relevant to the entered query and return a listing of the documents to the user via retriever 142 and network 110. In embodiments of the invention, search engine 148 may receive a natural language query, a corresponding structured query (i.e., the extracted tagged information/metadata), or any combination thereof from natural domain language adapter 144, and search the created indices stored within searchable index and metadata 150. In embodiments of the invention, search engine 148 may define a grammar and syntax to define search criteria according to a particular query language. In an embodiment, search engine 148 may return a ranked listing of documents to query interface 122 via retriever 142 and network 110. In an example embodiment, search engine 148 may, in response to a query from domain language adapter 144, search through indices of documents including resumes and job offerings, each having associated tagged information, stored within searchable index and metadata 150. In other embodiments of the invention, search engine 148 may be a stand-alone software component on server 140 outside of retriever 142. In yet other embodiments, search engine 148 may be located on another computing device (not shown) accessible to IR System 100 and described generally with respect to FIG. 7 below.

Figure 3:
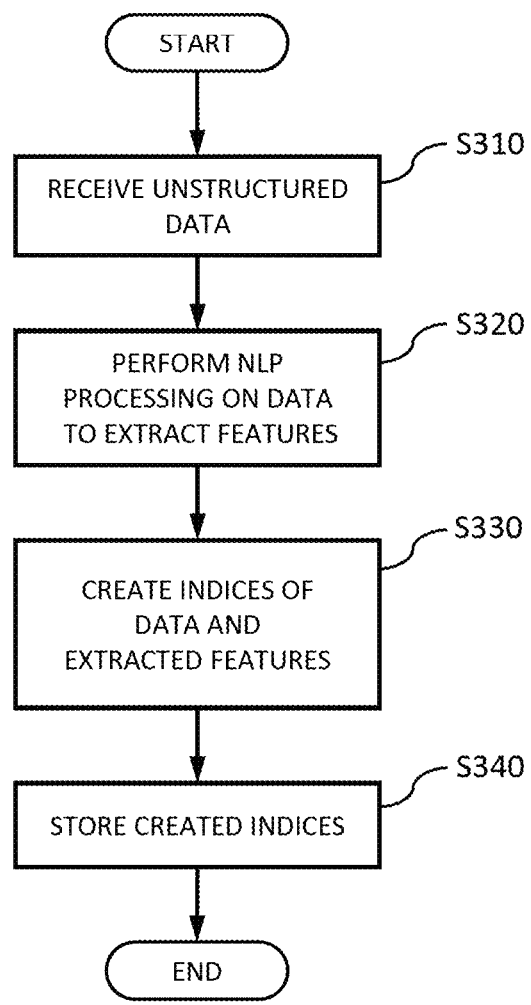
FIG. 3 is a flowchart illustrating indexing and enrichment operations of the retriever of FIG. 2, in accordance with an embodiment of the invention.

FIG. 3 shows a flowchart illustrating indexing and enrichment operations of retriever 142 in accordance with an example embodiment of the invention. Referring to step S310, retriever 142 receives unstructured data (e.g., documents) from unstructured corpus 130, via network 110. In an example embodiment, the received data may be a corpus of documents related to job offerings/posts and resumes which have been collected by IR System 100. Referring to step S320, retriever 142 sends the received data to subcomponent natural language processing engine 143 for analysis of the unstructured content of the data using standard or specific domain models. Natural language processing engine 143 uses natural language processing techniques to extract features such as keywords, entities, concepts and relations, and packages the extracted features as document metadata (e.g., tags). In an example embodiment, natural language processing engine 143 extracts keywords, entities, concepts, relations, or any combination thereof from the documents related to job offerings/posts and resumes received in step S310. Referring to step S330, the documents received in step S310, together with the metadata extracted in step S320, are sent to subcomponent indexing module 146 of retriever 142 where indices of the corpus of documents, together with extracted metadata are created. In an example embodiment, indices of the documents related to job offerings/posts and resumes, together with their extracted metadata, are created. Referring to step S340, retriever 142 stores the indices created in step S330 within searchable index and metadata 150.

Figure 4:
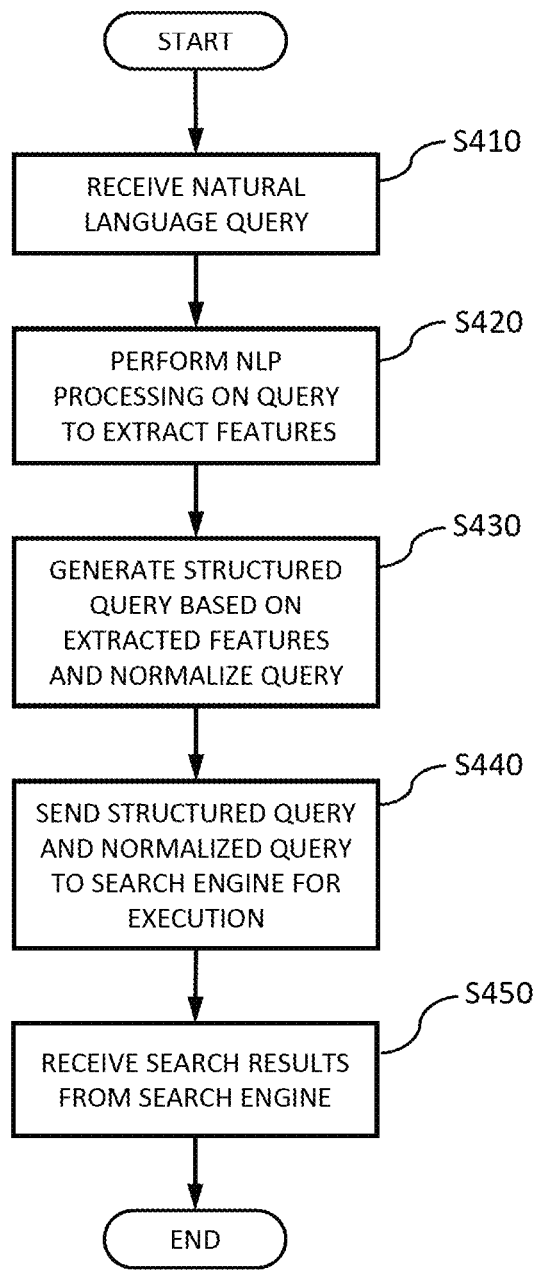
FIG. 4 is a flowchart illustrating search operations of the retriever of FIG. 2, in accordance with an embodiment of the invention.

FIG. 4 shows a flowchart illustrating search operations of retriever 142 in accordance with an example embodiment of the invention. Referring to step S410, retriever 142 receives text of a natural language query from a user of computing device 120 via query interface 122 and network 110. The user may enter the natural language query by typing or by voice interaction (e.g., using speech to text functionality to capture the text). In an example embodiment, retriever 142 receives text of a natural language query describing desired qualifications for matching with a job offering.

Referring to step S420, retriever 142 sends the received natural language query to its subcomponent, natural language processing engine 143. Natural language processing engine 143 analyzes the text of the received natural language query using standard or specific domain models and extracts features (i.e., creates tagged information/metadata) such as keywords, entities, concept and relations. The output of step S420 is both the extracted features and the original text of the natural language query (i.e., captured text). In an example embodiment, metadata is extracted from the text of the natural language query describing desired qualifications for matching with a job offering.

Referring to step S430, retriever 142 directs the output of step S420 (i.e., the original natural language query and its corresponding extracted features) to its subcomponent, domain language adapter 144. In an example embodiment, domain language adapter 144 accepts as input, in part, the feature set extracted by natural language processing engine 143 and generates, with a neural network algorithm that adapts the discrete input elements of the feature set, a structured query suitable for search engine 148 (i.e., executable according to a defined grammar and syntax of a search engine 148). A fundamental aspect of embodiments of the invention is the transformation of a natural language query to a structured language expression (e.g., a structured query) used by a search engine to define a filter to retrieve pertinent data from a knowledge base (e.g., searchable index and metadata 150). In embodiments of the invention, transforming the feature set into the structured query includes applying a machine learning model to the feature set. The machine learning model being trained based on data comprising a plurality of training records, where one of the records includes the feature set and a structured query statement corresponding to the feature set.

Each target search engine defines its own grammar and syntax to define structured search criteria according to its query language. While a rule-based approach could be a relatively simple method to achieve the desired transformation from a natural language query to a structured query, it has a drawback in that it requires duplication for each target search engine. As an advantageous alternative, embodiments of the present invention create a general search engine independent translation layer that can be trained to produce valid search criteria to be used as query filters on natural language queries. This alternative can be achieved applying proven language translation techniques similar to those used by automated translation engines (i.e. Watson Translation, Google Translate, and others).

Figure 5:
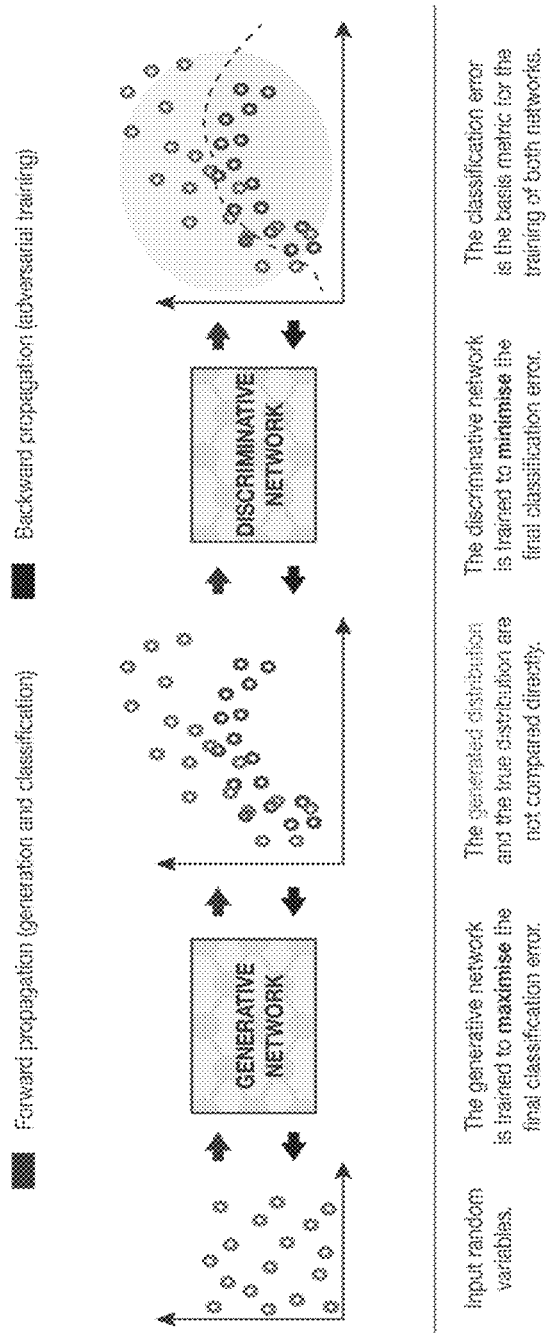
FIG. 5 is a diagram of aspects of the information retrieval system of FIG. 2 involved with Generative Adversarial Networks, according to an embodiment of the invention.

With continued reference to step S430, in order to create a search engine independent translation layer, domain language adapter 144 implements an architecture which consists of two neural networks, as depicted in FIG. 5, that work together according to the Generative Adversarial Networks (GANs) pattern. A GAN is a machine learning model in which two neural networks (i.e., a generative network and a discriminative network) compete with each other to become more accurate in their predictions. Given a training set, this technique learns to generate new data with the same statistics as the training set. The generative network generates candidates while the discriminative network evaluates them. In embodiments of the claimed invention, the first network, the generative network (GN), has the task of generating candidate output filter expressions (e.g., structured searches) that can be used in a target search engine (e.g., search engine 148), while the second network, the discriminative network (DN), is used to validate the generated candidate output filter expressions. In embodiments of the claimed invention, the GN consists of a sequence-to-sequence (seq2seq) recurrent neural network, which is a family of machine learning model approaches used for language processing and is usually used in Deep Neural Network based translation engines, while the DN is a shallow (fully connected) neural network used to validate the outcomes of the GN. The required machine learning model training activities involves supplying to the DN training data which includes a set of valid input strings (i.e., natural language queries) and corresponding output filters (i.e., structured queries) in accordance with the grammar and vocabulary used by the target search engine.

Continuing with step S430, domain language adapter 144, in an example embodiment, further processes the text of the user input natural language query to normalize it according to applicable corresponding domain specific training. This further processing allows domain language adapter 144 to drop unnecessary elements (e.g., language) of the natural language query. For example, text such as "I am interested to find . . . " or "I'm looking for . . . " may be dropped from the query. Furthermore, in an example embodiment, domain language adapter 144 returns as output both the normalized natural language query and an automatically computed structured query, based on the extracted metadata, in a structured query language suitable for execution by search engine 148 thus increasing the precision of the search results.

As an illustration of example outputs resulting from subcomponents natural language processing engine 143 in step S420 and domain language adapter 144 in step S430, consider a scenario where IBM's Watson Discovery is utilized as the target search engine and Discovery Query Language (DQL) is defined as the grammar and vocabulary to be used. Given the user natural language query, "We need a profile with at least 3 years of experience as Senior Consultant in Artificial Intelligence area", natural language processing engine 143 (e.g., Watson Natural Language Understanding service) may extract the following features:

```
entities: [
    { type: TIMEFRAME,
      text: "3 years"}
    { type: ROLE,
      text: "Senior Consultant" },
    { type: SKILL,
      text: "Artificial Intelligence"}
]
relations: [ { type: ROLE_ASSIGNMENT,
    entities: [
        { type: ROLE,
          text: "Senior Consultant" },
        { type: SKILL,
          text: "Artificial Intelligence"}
] } ]
```

Continuing with the scenario, domain language adapter 144 may, based on the extracted features above and assuming that the trained system contains the extracted entities and relations, generate the following structured query:

entities:(type: TIMEFRAME, text: "3 years"),
relations:(type: APPLIED_SKILL, entities:(type: ROLE, text: "Senior Consultant"), entities:(type: SKILL,text: "Artificial Intelligence"))

For this scenario the training data set supplied to the DN of domain language adapter 144 would be represented by a set of real filter expressions in Discovery Query Language applicable to this query. The aim of step S430 is to assemble the features extracted in step S420 using logical operators like AND/OR in such a way as to produce a valid and meaningful structured query, based on the extracted features and in a language suitable for the target search engine, that can be effective to improve the pertinence of the search.

Referring to step S440, retriever 142 directs the output of step S430 (i.e., the normalized natural language query and the automatically computed structured query) to its subcomponent, search engine 148. In an example embodiment, the user's query is sent to search engine 148 as the normalized natural language query together with the generated structured query (i.e., the computed filter based on the extracted metadata), which searches searchable index and metadata 150. Referring to step S450, in an example embodiment, retriever 142 returns the documents retrieved by search engine 148, from searchable index and metadata 150, to the user of computing device 120, via query interface 122 and network 110, according to their relevance. In embodiments of the invention, users can provide feedback on the returned documents in order to further train the neural networks used by domain language adapter 144. For instance, if the feedback is positive, the filter expression (i.e., the structured search query) generated by the GN, and used by search engine 148 to search searchable index and metadata 150, can be automatically added to the training set of the DN in order to refine the generating filter capabilities of the GN.

Figure 6A:
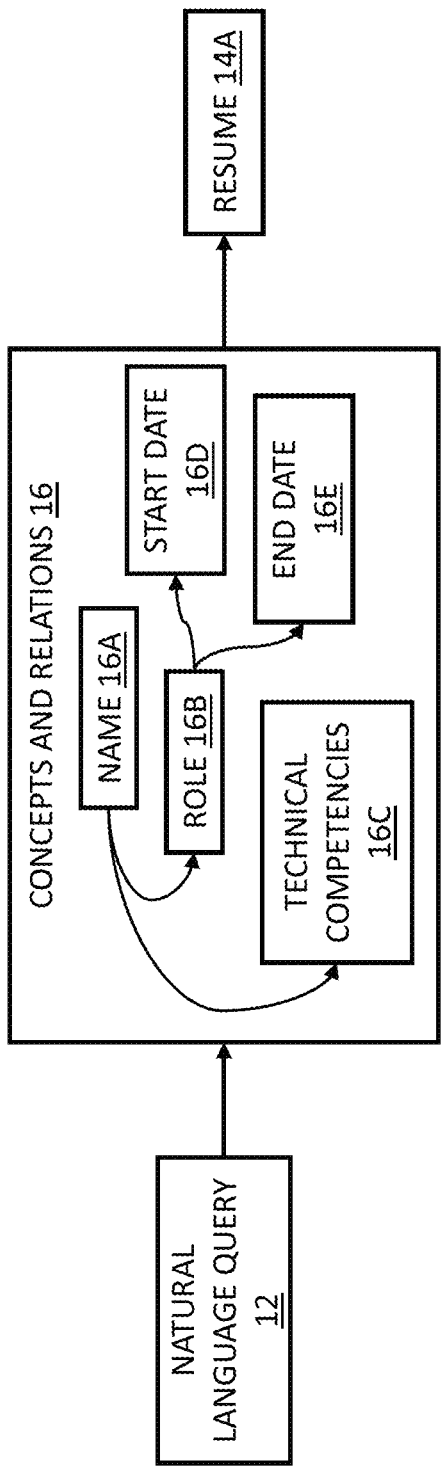
FIGS. 6A-B depict illustrative examples of search results resulting from implementation of the information retrieval system of FIG. 2, in accordance with an embodiment of the invention.
Figure 6B:
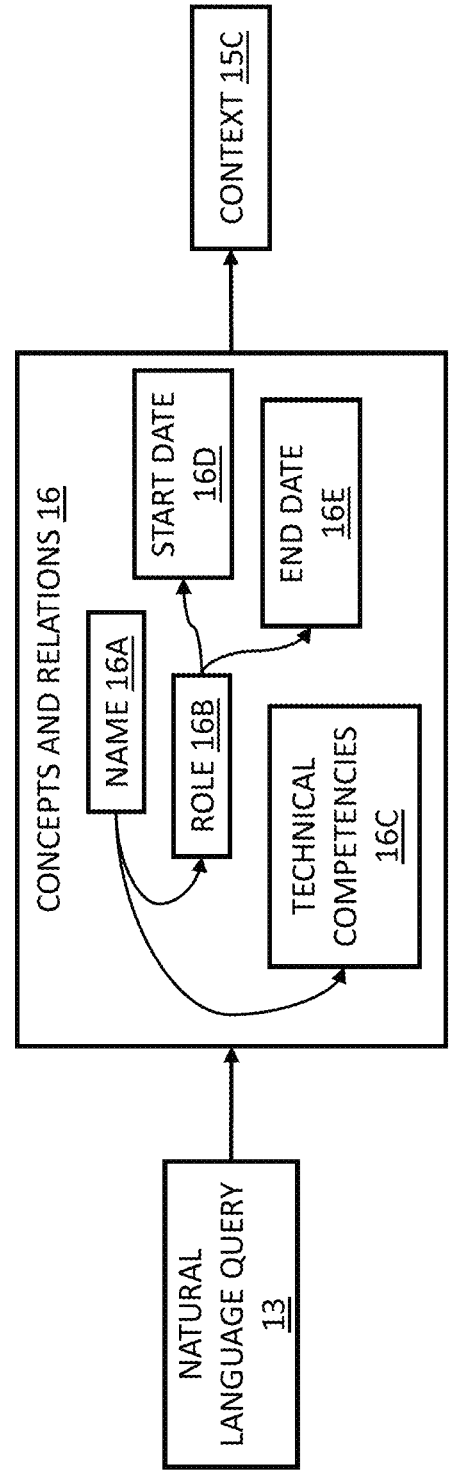

FIG. 6A exemplifies a desired level of search result precision attainable through embodiments of the present invention (e.g., IR System 100), as opposed to the results reached using only the natural language query approach depicted in FIG. 1A, while maintaining the advantageous level of recall associated with the use of natural language queries. For instance, FIG. 6A depicts resume 14A as being the result of natural language query 12 using concepts and relations 16. In addition, embodiments of the present invention provide for the support queries that require inferences on document context, as exemplified in FIG. 6B, as opposed to the results depicted in FIG. 1B. For instance, FIG. 6B depicts context 15C as being the result an inference of natural language query 13 using concepts and relations 16.

Figure 7:
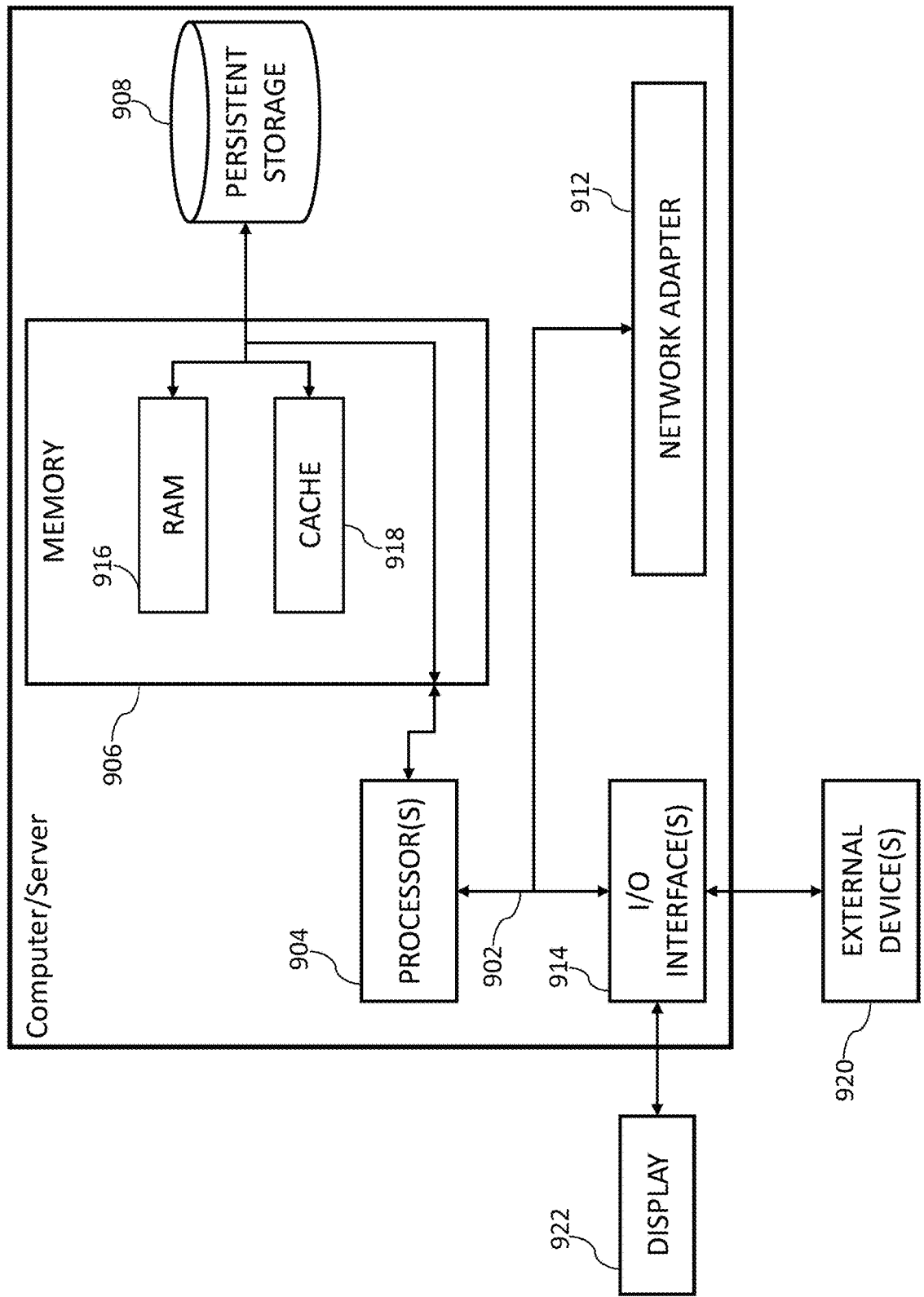
FIG. 7 is a block diagram depicting the hardware components of the information retrieval system of FIG. 2, in accordance with an embodiment of the invention.

FIG. 7 depicts a block diagram of components of computing device 120, unstructured corpus 130, and server 140, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 120, unstructured corpus 130, and server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs query interface 122 in computing device 120; and retriever 142 (with subcomponents natural language processing engine 143, domain language adapter 144, indexing module 146, and search engine 148) in server 140 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs query interface 122 in computing device 120; and retriever 142 (with subcomponents natural language processing engine 143, domain language adapter 144, indexing module 146, and search engine 148) in server 140 may be downloaded to persistent storage 908 through network adapter 912.

I/O interface(s) 914 allows for input and output of data with other devices that may be connected to computing device 120, unstructured corpus 130, and server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs query interface 122 in computing device 120; and retriever 142 (with subcomponents natural language processing engine 143, domain language adapter 144, indexing module 146, and search engine 148) in server 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
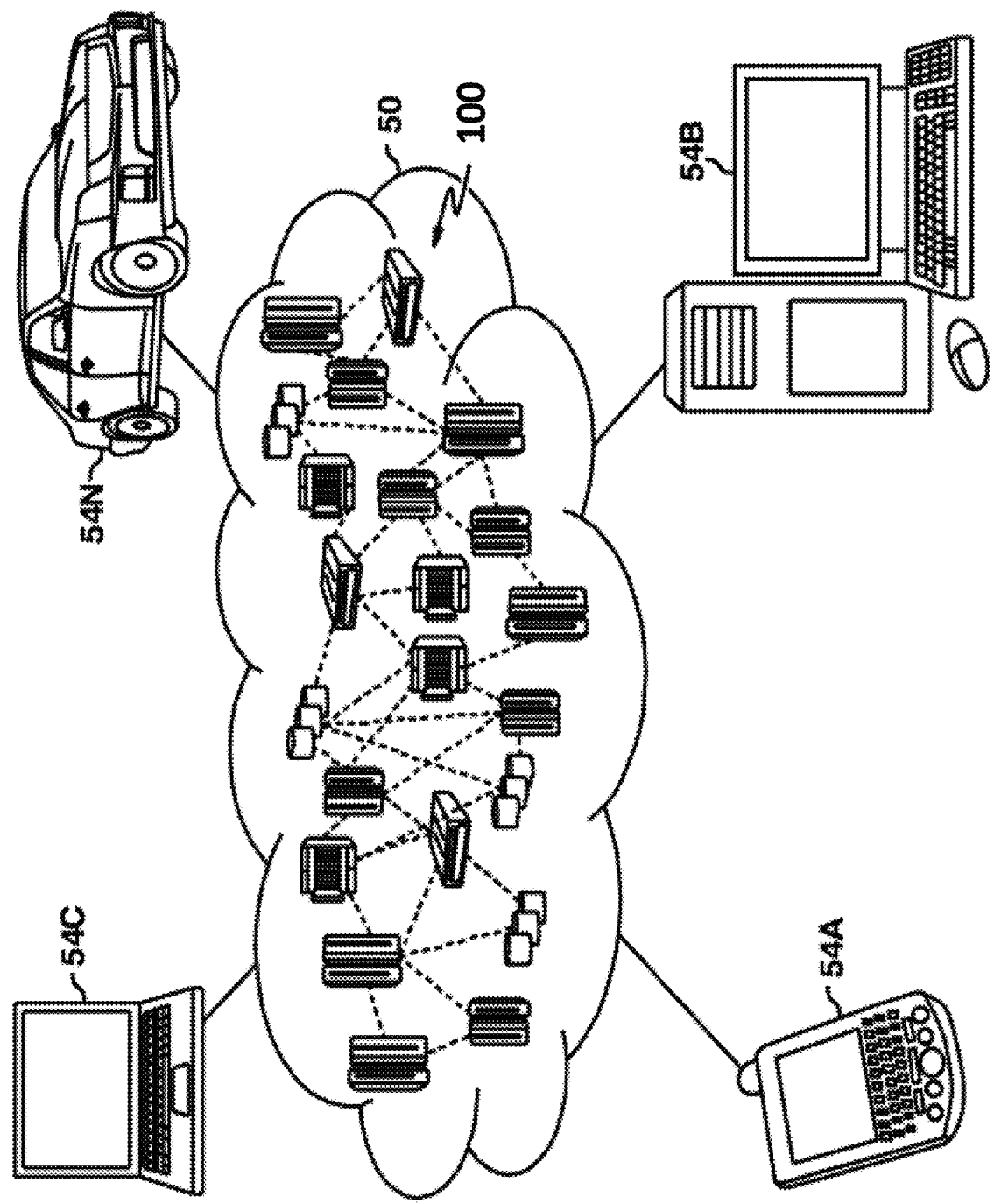
FIG. 8 depicts a cloud computing environment in accordance with an embodiment of the present invention.

Referring now to FIG. 8, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Figure 9:
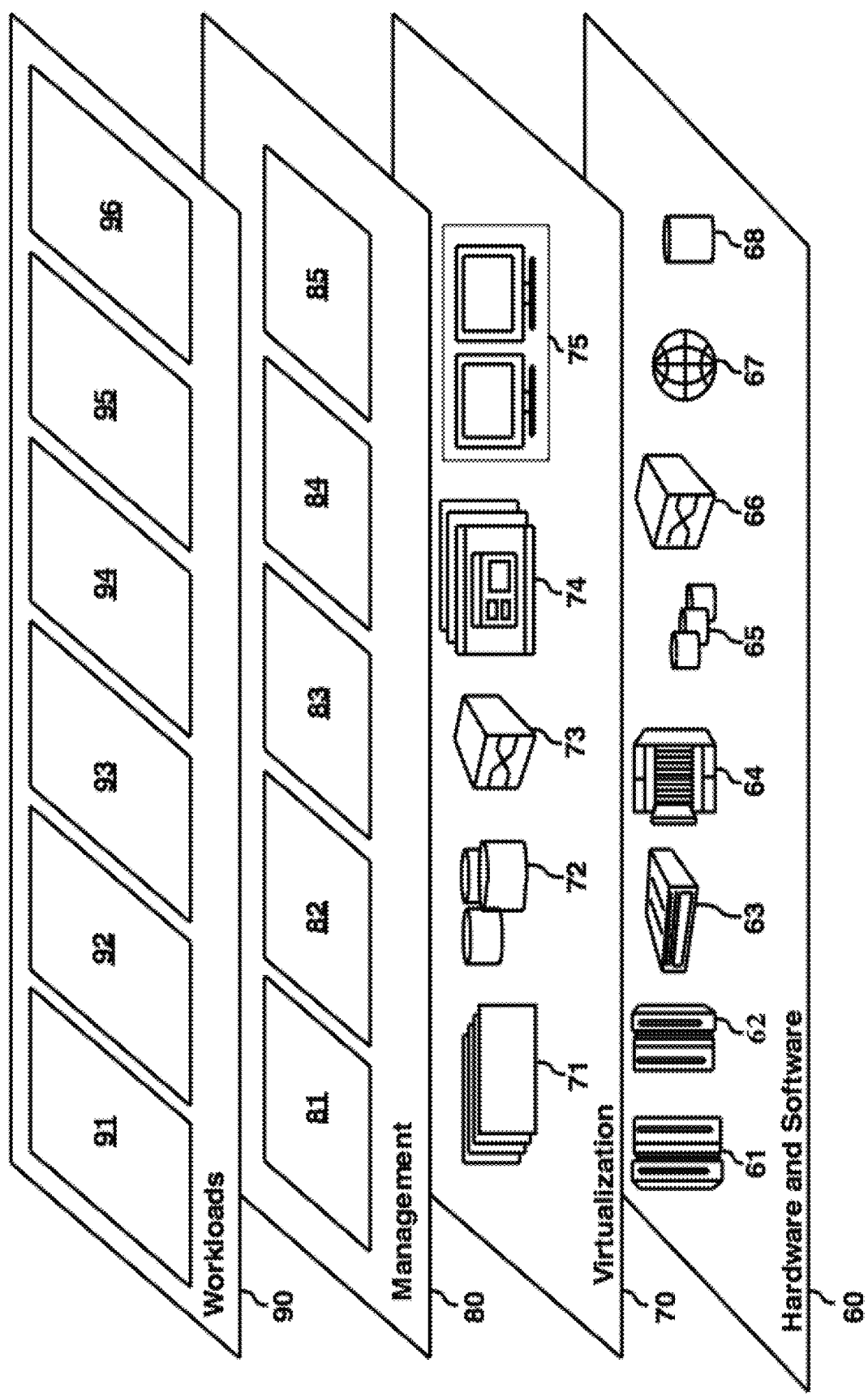
FIG. 9 depicts abstraction model layers in accordance with an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and information retrieval system 96. Information retrieval system 96 may relate to leveraging advantages offered by the use of natural language queries in terms of query results recall, while also providing advantageous results in terms of query results precision by also leveraging tags (i.e., metadata) associated with documents of a searched corpus.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer-implemented method for processing a natural language query, the method comprising:
   receiving text of the natural language query;
   extracting a set of features from the text through natural language processing;
   generating a structured query based on the set of features, wherein a generative adversarial network (GAN) is used in generating the structured query based on the set of features, and wherein the GAN applies a machine learning model to the set of features, and wherein the machine learning model is trained based on training data comprising a set of valid input strings and corresponding output filters in accordance with a grammar and a vocabulary used by a target search engine;
   normalizing the text to create a normalized natural language query;
   executing a search of a corpus via the structured query and the normalized natural language query; and
   returning results of the search.

2. The method of claim 1, further comprising:
   receiving user provided feedback on the returned results and further training the GAN based on the received user feedback.

3. The computer-implemented method of claim 1, wherein normalizing the text comprises dropping unnecessary language from the text, and wherein the normalizing is according to applicable corresponding domain specific training.

4. The computer-implemented method of claim 1, wherein the set of features comprises one or more of keywords, entities, concepts, and relations.

5. The computer-implemented method of claim 1, wherein the generated structured query comprises elements of the extracted set of features combined with logical operators.

6. The computer-implemented method of claim 1, wherein the natural language query is received from a user via an interface of the corpus.

7. A computer program product for processing a natural language query, the computer program product comprising:
   one or more computer-readable tangible storage devices and program instructions stored on at least one of the one or more computer-readable tangible storage devices, wherein the program instructions are executable by a computer, the program instructions comprising:
   program instructions to receive text of the natural language query;
   program instructions to extract a set of features from the text through natural language processing;
   program instructions to generate a structured query based on the set of features, wherein a generative adversarial network (GAN) is used in generating the structured query based on the set of features, and wherein the GAN applies a machine learning model to the set of features, and wherein the machine learning model is trained based on training data comprising a set of valid input strings and corresponding output filters in accordance with a grammar and a vocabulary used by a target search engine;
   program instructions to normalize the text to create a normalized natural language query;
   program instructions to execute a search of a corpus via the structured query and the normalized natural language query; and
   program instructions to return results of the search.

8. The computer program product of claim 7, further comprising:
   program instructions to receive user provided feedback on the returned results and further training the GAN based on the received user feedback.

9. The computer program product of claim 7, wherein normalizing the text comprises dropping unnecessary language from the text, and wherein the normalizing is according to applicable corresponding domain specific training.

10. The computer program product of claim 7, wherein the set of features comprises one or more of keywords, entities, concepts, and relations.

11. The computer program product of claim 7, wherein the generated structured query comprises elements of the extracted set of features combined with logical operators.

12. The computer program product of claim 7, wherein the natural language query is received from a user via an interface of the corpus.

13. A computer system for processing a natural language query, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
program instructions to receive text of the natural language query;
program instructions to extract a set of features from the text through natural language processing;
program instructions to generate a structured query based on the set of features, wherein a generative adversarial network (GAN) is used in generating the structured query based on the set of features, and wherein the GAN applies a machine learning model to the set of features, and wherein the machine learning model is trained based on training data comprising a set of valid input strings and corresponding output filters in accordance with a grammar and a vocabulary used by a target search engine;
program instructions to normalize the text to create a normalized natural language query;
program instructions to execute a search of a corpus via the structured query and the normalized natural language query; and
program instructions to return results of the search.

14. The computer system of claim 13, further comprising:
program instructions to receive user provided feedback on the returned results and further training the GAN based on the received user feedback.

15. The computer system of claim 13, wherein normalizing the text comprises dropping unnecessary language from the text, and wherein the normalizing is according to applicable corresponding domain specific training.

16. The computer system of claim 13, wherein the set of features comprises one or more of keywords, entities, concepts, and relations.

17. The computer system of claim 13, wherein the generated structured query comprises elements of the extracted set of features combined with logical operators.

* * * * *